(12) United States Patent
Oshina et al.

(10) Patent No.: US 6,955,395 B2
(45) Date of Patent: Oct. 18, 2005

(54) MODULE-STRUCTURE FOR ROOF TRIM

(75) Inventors: Masato Oshina, Kanagawa (JP); Masayuki Saito, Kanagawa (JP)

(73) Assignee: Kasai Kogyo Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/602,829

(22) Filed: Jun. 25, 2003

(65) Prior Publication Data

US 2004/0145218 A1    Jul. 29, 2004

(51) Int. Cl.⁷ ................................................ B60R 13/02
(52) U.S. Cl. ................................................ 296/214
(58) Field of Search .......................... 296/39.1, 37.7, 296/97.1, 97.9, 210, 214, 71; 16/383, 444, 16/DIG. 24, DIG. 41; 29/418, 453; 52/716.5, 52/716.6, 716.7; 403/251, 252, 297; 411/41, 411/45, 46

(56) References Cited

U.S. PATENT DOCUMENTS

| | | | |
|---|---|---|---|
| 5,093,976 A * | 3/1992 | Malinow et al. ............... | 29/451 |
| 5,105,521 A | 4/1992 | Dowd et al. | |
| 5,519,917 A * | 5/1996 | Cordonnier ................... | 16/422 |
| 6,415,478 B1 | 7/2002 | Watanabe et al. | |
| 6,422,644 B1 * | 7/2002 | Miller et al. ................. | 296/214 |
| 6,428,089 B1 * | 8/2002 | Noda ........................... | 296/214 |
| 6,769,849 B2 * | 8/2004 | Yoneoka ....................... | 411/45 |
| 2003/0075955 A1 * | 4/2003 | Tiesler et al. ................ | 296/214 |
| 2003/0094828 A1 * | 5/2003 | Nagamoto .................... | 296/39.1 |
| 2004/0145218 A1 * | 7/2004 | Oshina et al. ................ | 296/214 |
| 2004/0175250 A1 * | 9/2004 | Yoneoka ....................... | 411/45 |

FOREIGN PATENT DOCUMENTS

WO        WO 01 42041 A    6/2001

* cited by examiner

Primary Examiner—Dennis H. Pedder
(74) Attorney, Agent, or Firm—Dickstein Shapiro Morin & Oshinsky, LLP

(57) ABSTRACT

A module-structure for roof trim, in which a roof trim and various accessories are modularized, capable of avoiding interference with vehicle body units such as a curtain type air bag, simplified in structure and enhanced in workability ease is to be provided. The configuration of the module-structure is such that attachment members 50 of assist grips (accessories) are temporarily secured to a roof trim 10 and a resin-made bracket 30; in a state in which connecting portions 54 at the tips of the attachment members 50 are accommodated in the resin-made bracket 30, positioning relative to a roof panel P is done while avoiding interference with other components; then the attachment members 50 is pressed in towards the roof panel P; and inserted body 60 are put in; the connecting portions 54 of the attachment members 50 are thereby locked and the attachment members 50 of the assist grips 20 easily fixed to the panel P, resulting in installing operation ease.

5 Claims, 9 Drawing Sheets interior side of vehicle exterior side of vehicle interior side of vehicle exterior side of vehicle

MODULE-STRUCTURE FOR ROOF TRIM

BACKGROUND OF THE INVENTION

1. Field of the Invention

The present invention relates to a module-structure for roof trim, and more particularly to a module-structure for roof trim to enable, when a roof trim is to be installed to the interior side of a roof panel, accessories to be fitted to the interior side of the roof trim including assist grips, a housing for a room mirror and brackets for sun visors, to be fitted at the same time and the number of interior components to be reduced.

2. Description of the Related Art

The usual configuration of the roof of a vehicle body is such that a roof trim is arranged on the interior side of a roof panel and various accessory parts including assist grips, a bracket for a room mirror and brackets for sun visors on the interior side of the roof trim are installed. A structure for fitting an assist grip, which is fitted to a side edge of the roof trim to help the passenger keep his or her body upright when the vehicle is turning a sharp curve or the like and cited here as one example of such accessory part, and the roof trim to the roof panel will be described with reference to FIG. 13. In the drawing, a roof trim 1 is formed in a slightly curved panel shape, and is configured by adhering a surface skin material 1b, such as cloth, over a trim base 1a having an appropriate shape-holding property.

To fit the roof trim 1 and an assist grip 2 to a roof panel 3, first the roof trim 1 is pinched between an assist grip base 2a and a clip base 4a of a clip 4, and fixed with a screw 4b. Further, after positioning the roof trim 1, to which the assist grip 2 has been fitted, relative to the roof panel 3, the roof trim 1 and the assist grip 2 are integrally fitted and fixed to the roof panel 3 as shown in FIG. 14 by securing the clip 4 to an attachment hole 3a of the roof panel 3.

In such a module-structure in which the roof trim 1 is simultaneously fitted, in a state it is pinched between the assist grip base 2a and the clip base 4a of the clip 4, to the roof panel 3 together with the assist grip 2, it is difficult to insert the clip 4 into the attachment hole 3a of the roof panel 3 because the direction of fitting to the vehicle body is about 45° different from the fitting face of the roof panel 3, and this constitutes a major factor to deteriorate the workability.

There is pointed out another problem that, when the roof panel 3 is installed with vehicle body units (such as harnesses, feeders, brackets and curtain type air bags), they may be set in the part denoted by sign a in FIG. 13, with the result that the clip 4 may interfere with these vehicle body units on the fitting locus of the roof trim 1, making modularization difficult unless a sufficient clearance is secured, which means a serious spatial constraint.

To solve these problems, the present applicant previously filed a patent application for an improved module-structure for the assist grip 2 to be fitted to the roof trim 1. According to that invention, as shown in FIG. 15, on the back side of the roof trim 1 to which the assist grip 2 is to be fitted, a resin-made side bracket 5 is fitted either mechanically, for instance by push-on-fixing, or by ultrasonic welding or the like. On the other hand, retainers 6 provided at the two ends of the assist grip 2 are temporarily held in an opening for fitting to the roof trim 1 and the side bracket 5 via claws 6a.

An iron clip 6b is fitted to the tip of each of these retainers 6 with a screw 6c. In a state in which the assist grip 2 is held on to the roof trim 1 via the claws 6a of the retainers 6, the module-structure of the assist grip 2 for the roof trim 1 is realized by snapping the iron clips 6b provided on the fitting end side of the retainers 6 into the attachment hole 3a of the roof panel 3 at the same time as the roof trim 1 is fitted to the roof panel 3.

The above-described module-structure of the assist grip 2 for the roof trim 1 makes it possible to avoid interference with vehicle body units fitted on the body panel, and seems to promise smooth fitting work for accessories including the assist grip 2. However, as this configuration requires fixing of the iron clips 6b with the screws 6c to the retainers 6 provided at the two ends of the assist grip 2, the number of components involved is larger, which invites a higher cost and a deterioration in assembling workability.

An object of the present invention, attempted in view of this circumstance, is to provide a module-structure for roof trim permitting, when a roof trim is to be installed to the roof panel, simultaneous fitting of assist grips, a bracket for a room mirror and brackets for sun visors. The structure makes it possible to avoid interference of the roof trim with vehicle body units fitted on the body panel, and to lower the cost while enhancing the workability of assembly by reducing the number of components.

SUMMARY OF THE INVENTION

In order to solve the problem noted above, according the invention, there is provided a module-structure for roof trim for use in installing a roof trim and various accessories to an interior side of a vehicle roof panel by placing a bracket having a spacer function between the roof trim and the roof panel in the positions matching the accessories, the module-structure comprising; (a) attachment members formed on said accessories, wherein attachment members are connected into the bracket provided on the back side of the roof trim through openings in the roof trim so that accessories, roof trim and brackets are temporarily secured; are then aligned with the position corresponding to attachment holes in the roof panel; and are inserted into the roof panel and protruded in the fitting direction, thereby engaging connecting portions with the attachment holes of the roof panel; and (b) an inserted body inserted into the attachment members, wherein said inserted body locks the connecting portions of said attachment members by insertion so that said roof trim and accessories are integrally assembled to said roof panel through said bracket.

Since it is desirable for the roof trim here to be not only light in weight and to have an appropriate shape-holding property but also to feel pleasant to touch and look neat, the roof trim is usually configured by adhering a skin of cloth, woven or unwoven, to the surface of a molded base consisting of a glass fiber-reinforced synthetic resin plate, a foam resin plate of polyphenylene oxide (PPO) or the like or a fiber plate.

Further, the relevant accessories include assist grips, a bracket for a room lamp, a bracket for a room mirror, brackets and holders for sun visors, and hooks.

According to the present invention, accessories and brackets can be temporarily secured by placing brackets against the back face of the roof trim and inserting the attachment members of the accessories into the brackets through openings in the roof trim, as this causes the attachment members to engage with the brackets.

To fit these three modularized items to the roof panel, after placing the roof trim in a position where the attachment members of the accessories match attachment holes in the roof panel, the attachment members of the accessories are pressed in towards the roof panel. Then, the connecting portions of the attachment members protrude towards the roof panel and are snapped into the attachment holes in the roof panel and, with the roof trim pinched between the brackets and the attachment members, the three items tightly secured.

Therefore, conventional iron clips and screws for fixing the iron clips are made unnecessary, and the trouble of welding brackets to the roof trim can be also dispensed with, making it possible to reduce the number of components and installing process substantially.

Furthermore, when the accessories and brackets are temporarily secured to the roof trim by securing the attachment members and the brackets, if the connecting portions provided at the tips of the attachment members are accommodated into the bracket and a state in which the connecting portions do not protrude outside is maintained, interference with vehicle body units can be avoided when the modularized roof trim is installed into the roof panel.

Next in a preferred embodiment of the present invention, a securing structure to secure the brackets and the attachment members of the accessories temporarily holds the attachment members of the accessories in the brackets at their sub-attaching positions when the attachment members of the accessories are inserted into the brackets through the openings in the roof trim.

Regarding the securing structure to engage the attachment members of said accessories with the brackets here, there may be formed claws on one side and, on the other side, grooves to engage with the claws. The grooves may be provided only in the sub-attaching positions or in both the sub-attaching and fixing positions.

Where said brackets composed of a resin molding formed in a hollow box shape are used, energy consumed when the brackets are collapsed by an impact due to side collision of the vehicle can effectively damp the impact load of the side collision.

BRIEF DESCRIPTION OF THE DRAWINGS

FIG. 10 shows a state of the module-structure shown in FIG. 2 before the inserted body is put in;

FIG. 11 shows a state of the module-structure shown in FIG. 2 when the inserted body has been put in;

DETAILED DESCRIPTION OF THE PREFERRED EMBODIMENTS

A module-structure for roof trim, which is a preferred embodiment of the present invention, will be described in detail with reference to accompanying drawings.

Figure 1:
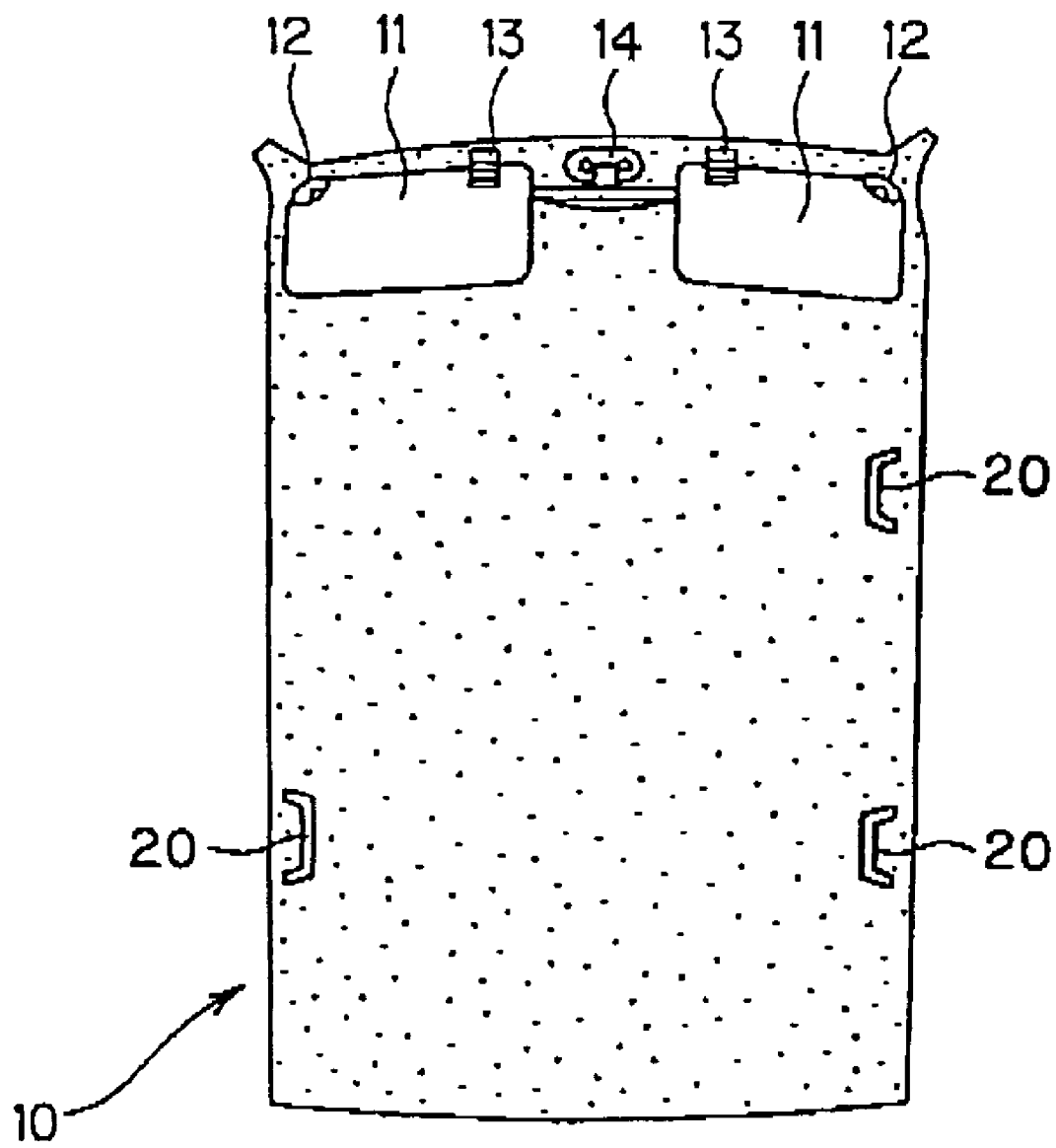
FIG. 1 shows a plan of a roof trim in a module-structure according to the present invention as viewed from the interior side of the vehicle.

In FIG. 1, a roof trim 10 is substantially similar in shape to a roof panel and is formed in a slightly curved manner. Brackets 12 and holders 13 of sun visors 11 and a bracket 14 for a room mirror are installed to the front edge of the roof trim, respectively. To the side edges of the roof trim 10 are secured assist grips 20 on both sides of the rear seat and on the passenger's side of the front seat.

There is used a so-called module-structure in which, when the roof trim 10 is fitted to the roof panel (not shown in FIG. 1), the components mentioned above (accessories) are assembled and fixed to the roof panel at the same time.

Figure 2:
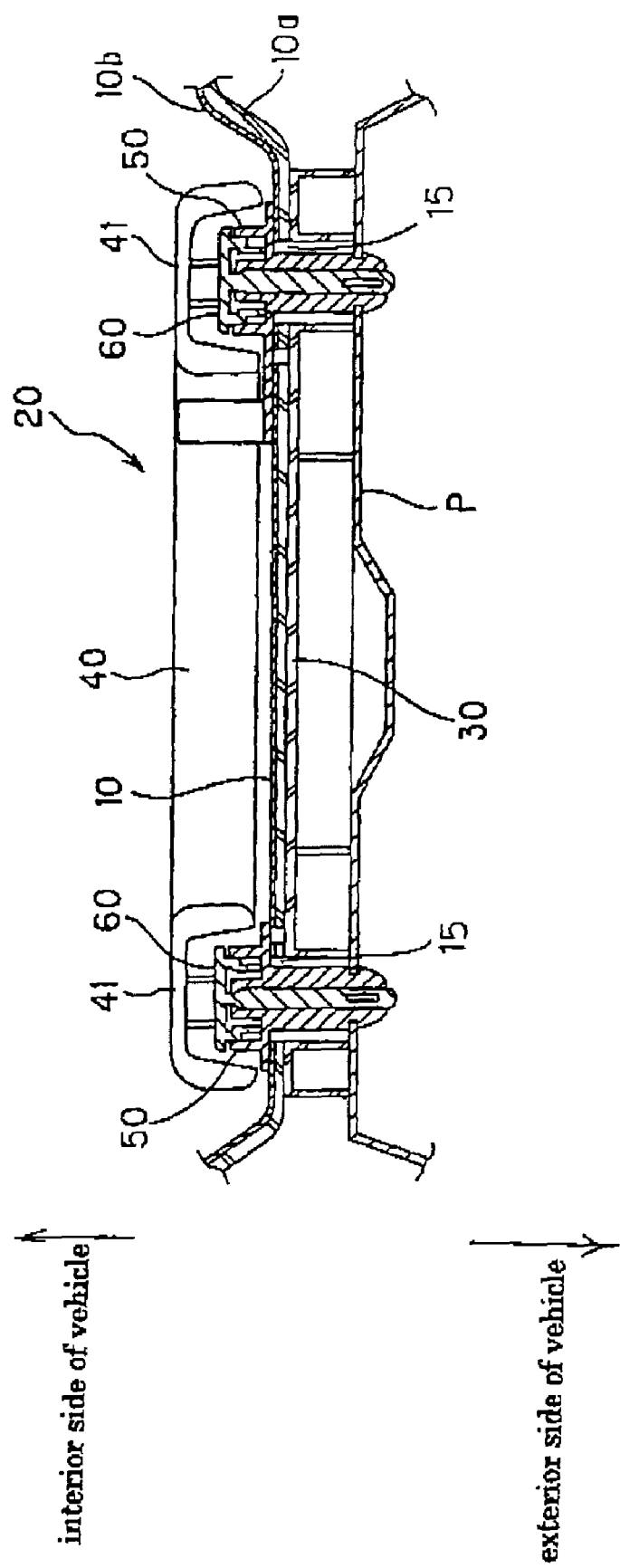
FIG. 2 shows a sectional view of one preferred embodiment in which the module-structure according to the present invention is applied to an assist grip.

FIG. 2 through FIG. 12 illustrate a module-structure, which is applied to the installing of the roof trim 10 and the assist grips 20 as a module-structure according to the invention. FIG. 2 shows a state in which one of the assist grips 20 is fitted to a roof panel P together with the roof trim 10, and FIG. 3 through FIG. 5, different views of an individual assist grip 20.

Thus, the roof trim 10 is configured by adhering a skin 10b consisting of cloth, woven or unwoven, to the surface of a glass fiber-reinforced polypropylene (PP) resin base 10a as shown in FIG. 2, and has rectangular openings 15 for fitting the assist grip 20.

Then when the assist grip 20 is fitted to the roof panel P together with the roof trim 10, a resin-made bracket 30 consisting of a box-shaped resin molding and having a spacer function is arranged between the roof trim 10 and the roof panel P as shown in FIG. 2. In place of the resin-made bracket 30, a metallic bracket may be used as well.

A feature of th present invention lies in that, when the roof trim 10 is fitted to the roof panel P, not only can the resin-made bracket 30 be assembled in addition to the roof trim 10 and the assist grip 20 to avoid interference with vehicle body units including the rails of a curtain type air bag installed on the roof panel P, but also can the number of components and that of assembling process be reduced.

Figure 3:
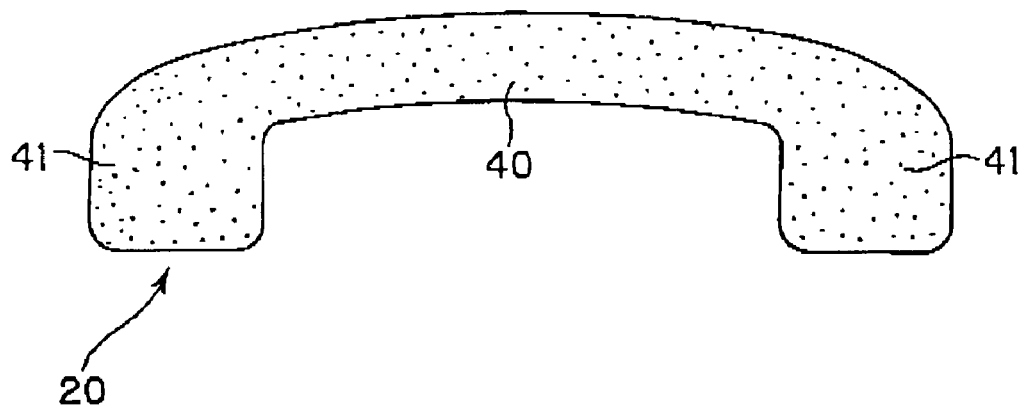
FIG. 3 shows a front view of the assist grip in the nodule-structure shown in FIG. 2.
Figure 4:
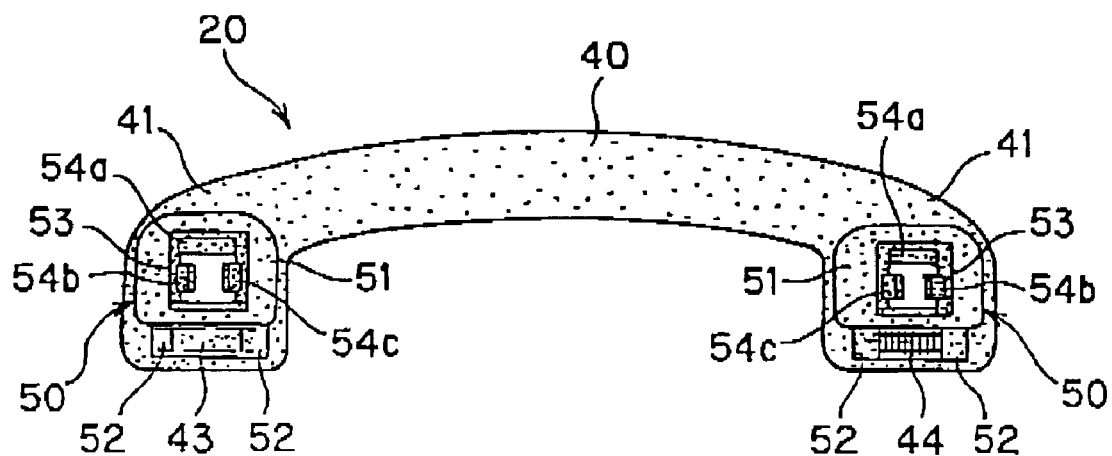
FIG. 4 shows a rear view of the assist grip in the module-structure shown in FIG. 2.
Figure 5:
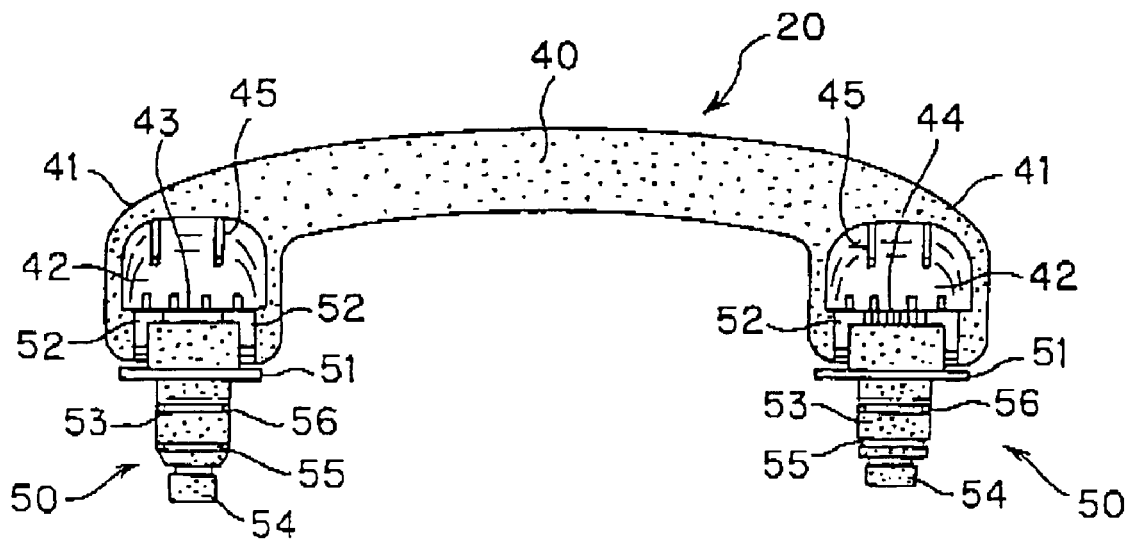
FIG. 5 shows a rear view of the assist grip in the module-structure shown in FIG. 2 with its attachment members erected upright.

Thus, FIG. 3 through FIG. 5 respectively show a front view, a rear view and another rear view, in which its attachment members are erected upright, of the assist grip 20. The assist grip 20 is substantially composed of a handle-shaped assist grip main body 40 consisting of an injection molding of synthetic resin, such as PP resin, attachment members 50 provided on bases 41 at the two ends of this assist grip main body 40, and inserted body 60 to be put into these attachment members 50.

More detail, the attachment members 50 to be provided on the bases 41 at the two ends of the assist grip main body 40 are provided with attachment plates 51 to be fitted to the surface of the roof trim 10 as well as with bearings 52 to be integrated with these attachment plates 51, and bearings 43 are provided in concaves 42 for accommodating leg members in the bases 41 of the assist grip main body 40. The bearings 52 and 43 are provided on one side with a hinge shaft (not shown) and on the other side with a coil spring 44 around the outer circumference of a hinge shaft.

Therefore, the assist grip main body 40 is held to be rotatable in a range of about 90° relative to the attachment members 50. Thus, when not in use, the assist grip main body 40 is pressed by the springy force of the coil springs 44 in the folding direction so as to overlap the surface of the roof trim 10 or, when in use, it is rotated by about 90° from this state towards the interior side of the vehicle against the springy force of the coil springs 44 to serve as a grip. As described so far, the assist grip 20 is provided in a foldable configuration.

Further on the back side of the attachment plates 51 in the attachment members 50, hollow cubic leg members 53 are provided protruding, and at the tip of each of these leg members 53 independent connecting portions 54 are integrally molded to have securing functions in three directions as shown in FIG. 4 and FIG. 5.

In the outer surface of the leg member 53, sub-attaching groove 55 for sub-attaching the attachment member 50 and fixing grooves 56 to so function as to fix the attachment member 50 to the roof panel P at a spacing corresponding to the length of the connecting portion 54 is provided.

Figure 6:
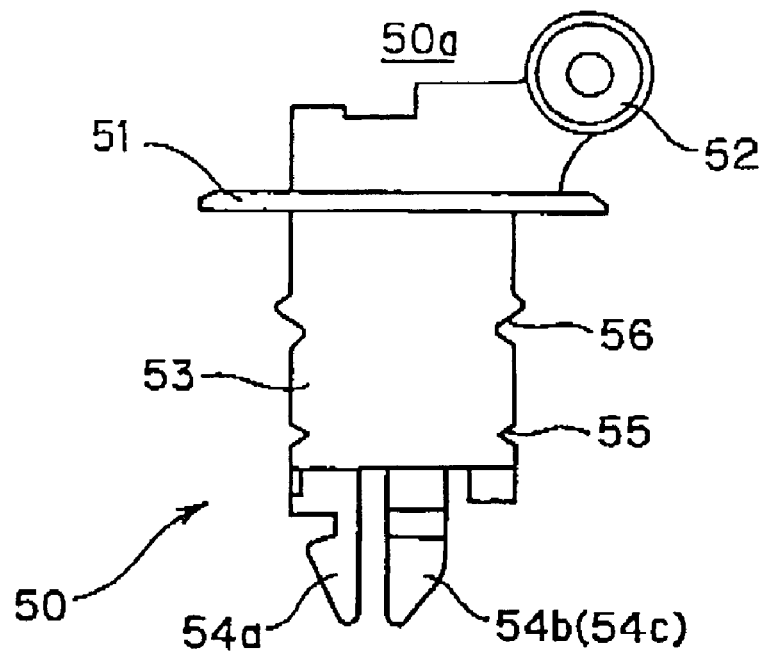
FIG. 6 shows a profile of an attachment member of the assist grip in the module-structure shown in FIG. 2.
Figure 7:
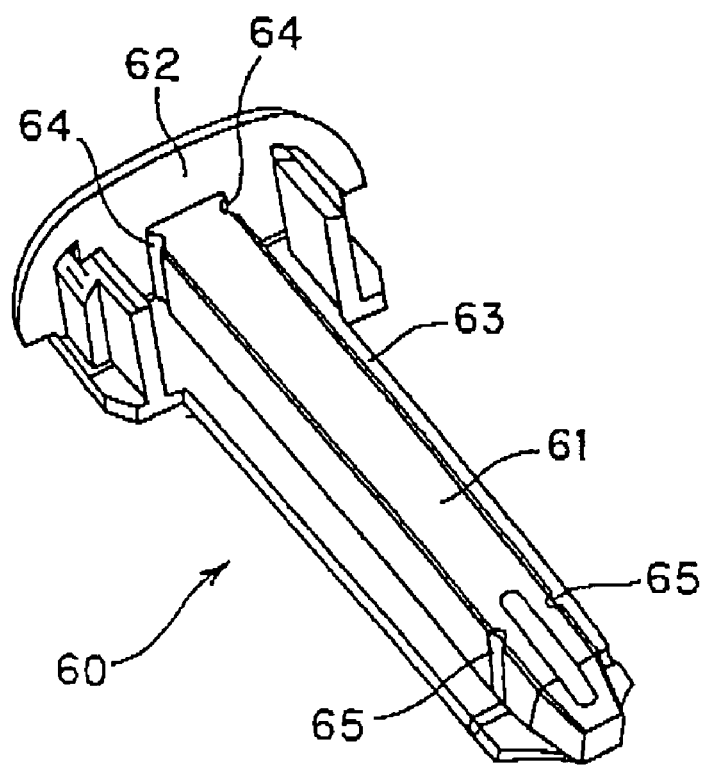
FIG. 7 shows a perspective view of an inserted body to be put into the attachment member of the assist grip in the module-structure shown in FIG. 2.

Next, as shown in FIG. 6, the attachment member 50 of the assist grip 20 can temporarily secure the roof trim 10 and the resin-made bracket 30 and, for fitting to the roof panel P, the leg member 53 is assembled to the back faces of the attachment plate 51 to avoid the interference of vehicle body units. At the tip of each of these leg members 53 are formed connecting portions 54a, 54b and 54c extending in three directions, the inserted body 60, shown in FIG. 7, intended to be put into these attachment member 50 is inserted.

The inserted body 60 is composed of a PP resin injection molding. Thus, to be inserted into the space formed by the connecting portions 54a, 54b and 54c extending in three directions, the inserted body 60 is provided with a stopper portion 61 to perform a stopper function, a cover flange 62 to lid an opening 50a formed in the attachment member 50, and a back plate 63 to be in contact with the inside of the leg member 53 and to permit sliding inserted body in a state of face contact. At the base of the stopper portion 61 is formed a securing groove 64 with which a pawl 57 provided in the leg member 53 is to be engaged.

Figure 8:
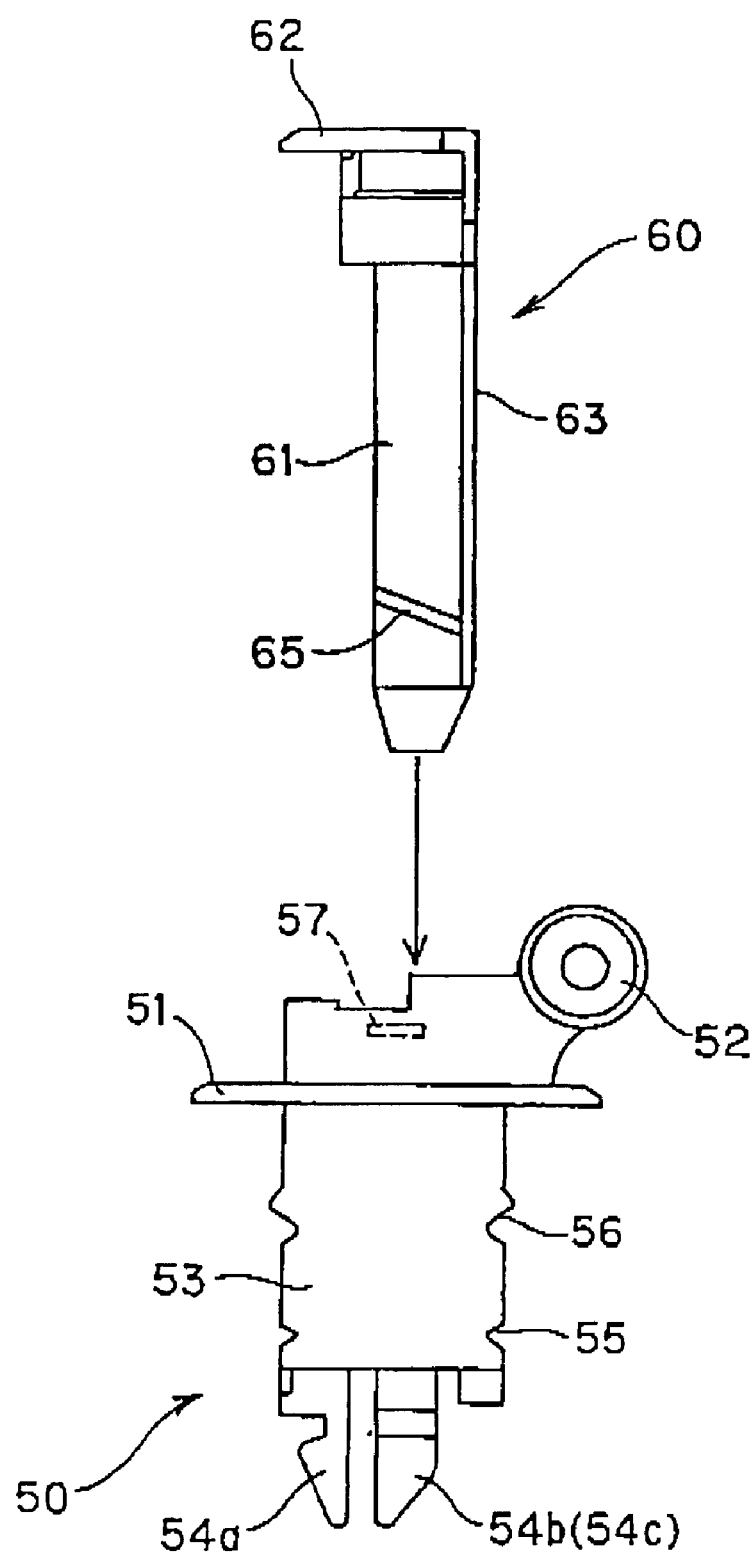
FIG. 8 shows a descriptive view in which the inserted body is put into the attachment member of the assist grip in the module-structure shown in FIG. 2.
Figure 9:
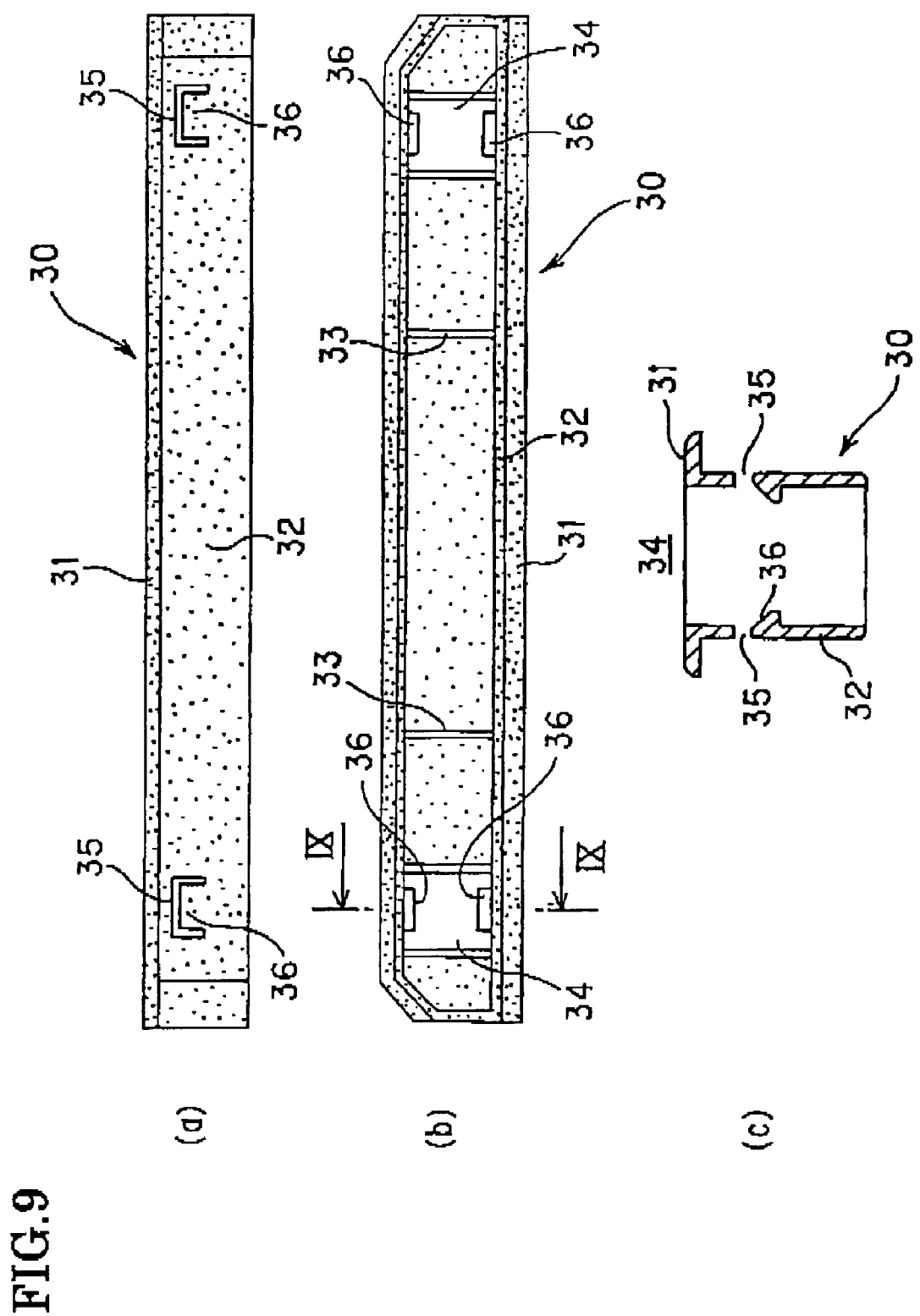
FIG. 9 show a resin-made bracket to be arranged on the back face of the roof trim in the module-structure according to the present invention: 9(a) showing a side view; 9(b), a plan view; and 9(c), a sectional view along line IX—IX in FIG. 9(b)

Then, when the inserted body 60 is put into the attachment member 50 as shown in FIG. 8, the pawl 57 within the attachment member 50 causes an inclined groove 65 in the inserted body 60 to fit in exactly, and the inserted body 60 is held inclined at a certain angle as illustrated. This is an advantage in avoiding the interference of the inserted body 60 with the assist grip main body 40 because it is supported by bearings 52 in the attachment member 50.

Further, since this inserted body 60 is put in, the tip of the inserted body 60 enters into the space formed by the connecting portions 54a, 54b and 54c to enable the inward flexures of these connecting portions 54 to be restrained and the connecting portion 54 to be locked. At the same time, the engagement of the pawl 57 of the attachment member 50 with the securing groove 64 on the base side of the stopper portion 61 enables the inserted body 60 to be locked within the attachment member 50.

Next will be described the resin-made bracket 30 arranged on the back side of the roof trim 10. This resin-made bracket 30 is configured by integrally molding a plate member 31 to be bonded to the back face of the roof trim 10, a side panel 32 extending from this plate member 31 towards the panel, and partitions 33 provided within the side panel 32, and has a box shape whose open face is directed towards the panel. Therefore, this resin-made bracket 30 not only has a spacer function, but also, especially when configured in a box shape, its energy consumption when collapsed by an impact due to side collision of the vehicle can effectively absorb the impact load of the side collision. However, it is not particularly limited to a box shape, but can as well be shaped like a channel or in some other way only if it has a spacer function.

Openings 34 for fitting the attachment members 50 of the assist grip 20 are provided on both sides, and claws 36 defined by staple-shaped slits 35 are formed on parts of the side panel 32 corresponding to these openings 34. Here, the securing structure between the attachment members 50 of the assist grip 20 and the resin-made bracket 30 is such that the engagement takes place in the sub-attaching position or the attaching position of each attachment member 50. Although the claws 36 of the resin-made bracket 30 are selectively engaged with the grooves 55 and 56 of the attachment members 50 in this embodiment of the present invention, claws can as well be provided on the attachment members 50 and grooves to engage with them provided in the resin-made bracket.

Figure 10:
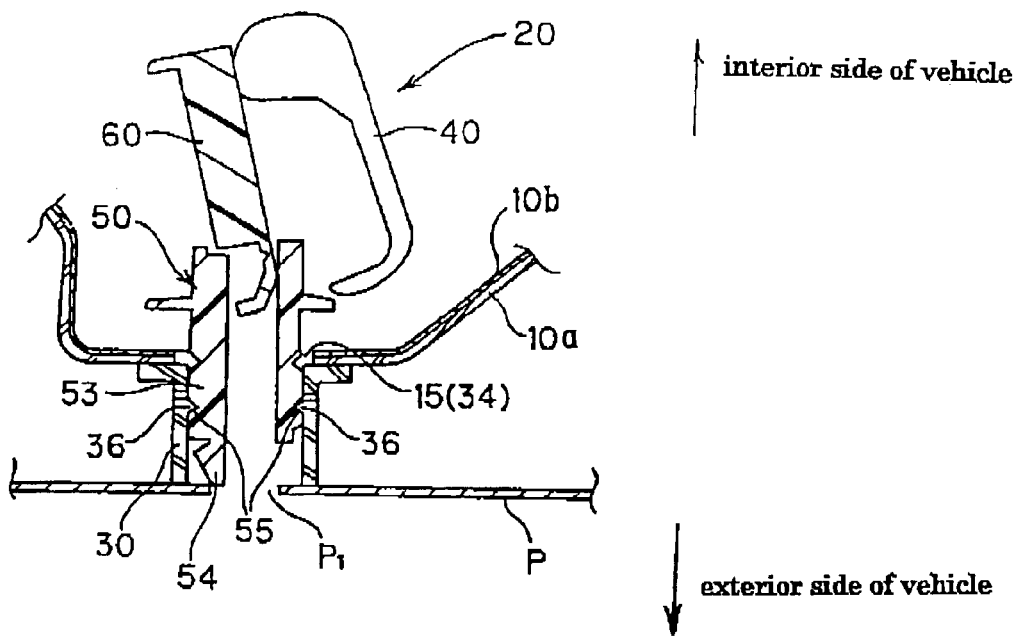

Next will be described a case in which the module-structure according to the present invention is applied to the assist grip 20 with reference to FIG. 10 and FIG. 11. First, as shown in FIG. 10, the resin-made bracket 30 having an impact absorbing function is so superposed over the back face of the roof trim 10 that their respective openings 15 and 34 coincide with each other; the leg members 53 of the attachment members 50 of the assist grip 20 are inserted into the openings 15 in the roof trim 10 and the openings 34 in the resin-made bracket 30; the resultant engagement of the claws 36 provided on the resin-made bracket 30 with the sub-attaching grooves 55 in the leg members 53 enables the assist grip 20 to be temporarily secured on to the roof trim 10 and the resin-made bracket 30; and, after assembling these three elements, the roof panel P is placed in its proper position.

After aligning the connecting portion 54 provided at the tip of the leg members 53 of the attachment member 50 with an attachment hole P1 of the roof panel P, the inserted body 60 is put into the attachment member 50. In this process, when the inserted body 60 is put in, the assist grip main body 40 is held upright relative to the attachment members 50 of the assist grip 20 against the elastic force of the spring, as the inserted body 60 is enabled by the inclined groove 65 to be held inclined at a prescribed angle, its placing is facilitated, meeting little interference by the assist grip main body 40.

Figure 11:
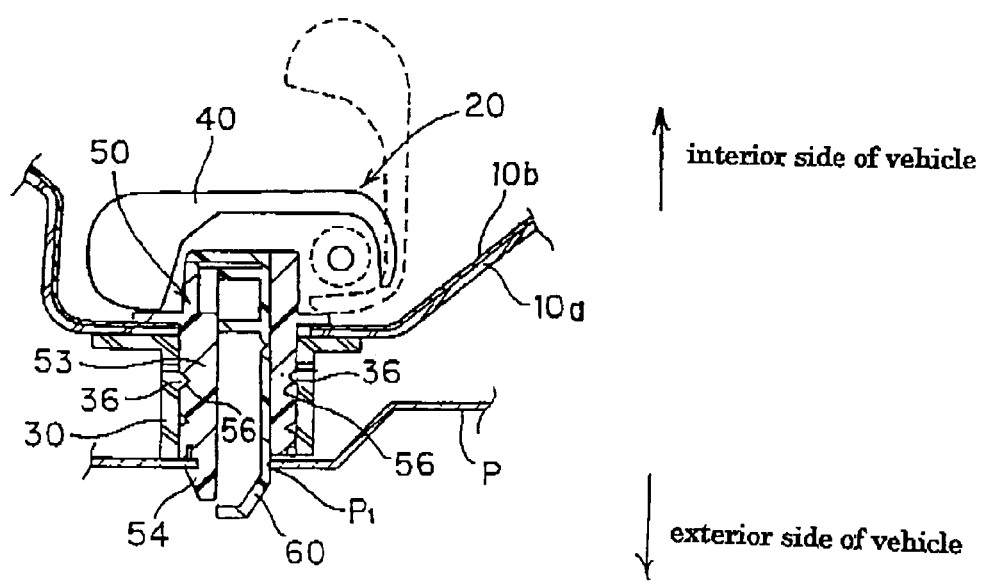

Then, as show in FIG. 11, by pressing in the attachment member 50 towards the roof panel P, securing the connecting portion 54 with the edge of the attachment hole P1 of the roof panel P, and securing the claws 36 of the resin-made bracket 30 into the fixing groove 56 of the leg members 53, the attachment member 50 of the assist grip 20 can be firmly assembled to the roof trim 10 and the resin-made bracket 30. In this process, the connecting portion 54 provided on the attachment member 50 protrudes from inside the resin-made bracket 30 towards the roof panel P and fits into the attachment hole P1 of the roof panel P.

After that, when the inserted body 60 has been put in, the engagement of the, pawl 57 within the attachment member 50 into the engaging groove 64 provided in the base of the stopper portion 61 causes the inserted body 60 to be locked within the attachment members 50, and the locking of the connecting portion 54 of the attachment member 50 by the tip of the inserted body 60 makes the locking of the connecting portion 54 with the roof panel P firmer, resulting in a firm enough fitting strength. Incidentally, the inclined groove 65 provided in the inserted body 60 for use in sub-attaching, though it is inclined in this embodiment of the present invention, may as well be horizontal for greater workability ease.

Thus, where the module-structure according to the present invention is applied to the assist grip 20, the assist grip 20 can be temporarily held on to the roof trim 10 and the resin-made bracket 30 with ease and, by pressing in the attachment members 50 towards the roof panel P which has been duly positioned and putting in the inserted body 60, the assist grip 20 can be easily fitted and fix d to the roof trim 10 and the roof panel P.

Therefore, when the roof trim 10 is to be installed to the roof panel P, as the connecting portions 54 are not protruding towards the roof panel P, there can be no interference with vehicle body units provided on the roof panel P, such as the rails of a curtain type air bag. Furthermore, since the assist grip 20 has such a configuration that the attachment members 50 for supporting the assist grip main body 40 are provided with the leg members 53 and the inserted body 60 are put into the attachment members 50, separate clips, screws for fixing the clips or the like as required in the conventional one are omitted, making it possible to reduce the number of equipment units. In addition, as the resin-made bracket 30 can be temporarily held integrally with the roof trim 10, dispensing with the welding the resin-made bracket to the roof trim in advance as is the conventional practice, there is an advantage that the fitting of the assist grip 20 can be completed easily and inexpensively.

Figure 12:
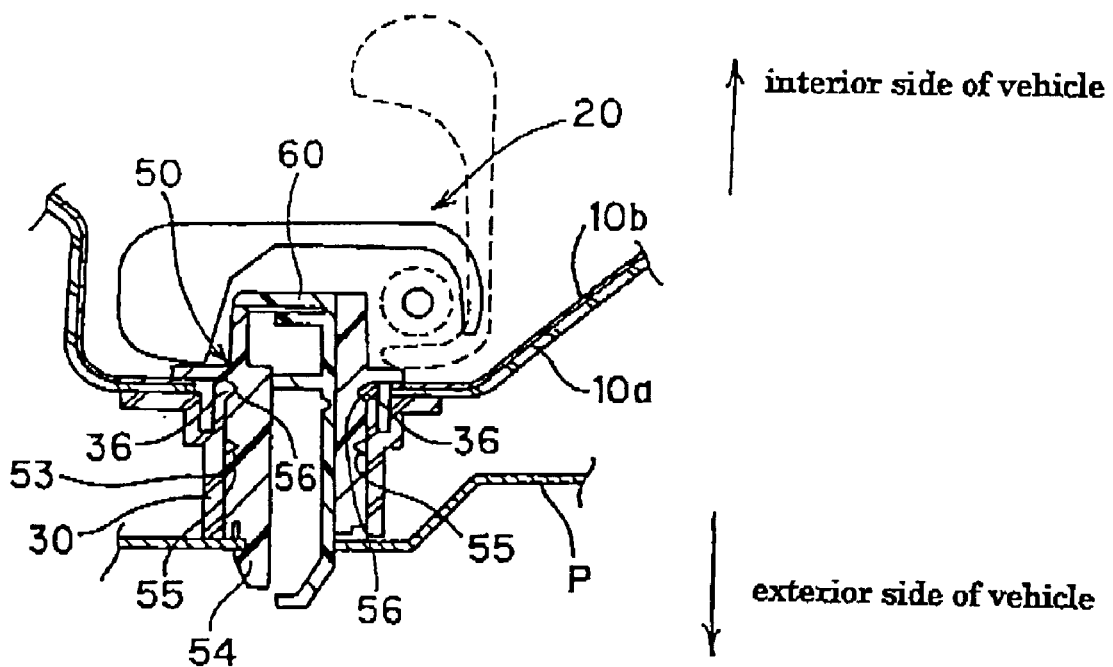
FIG. 12 shows a sectional view of a variation of the assist grip in the module-structure according to the present invention.
Figure 13:
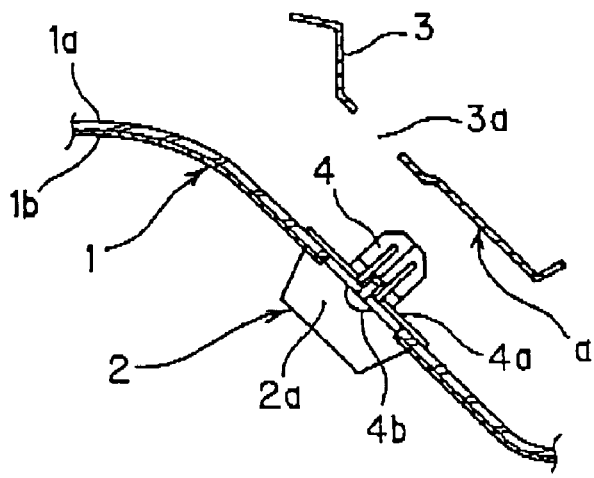
FIG. 13 shows how a conventional installing operation of a assist grip.
Figure 14:
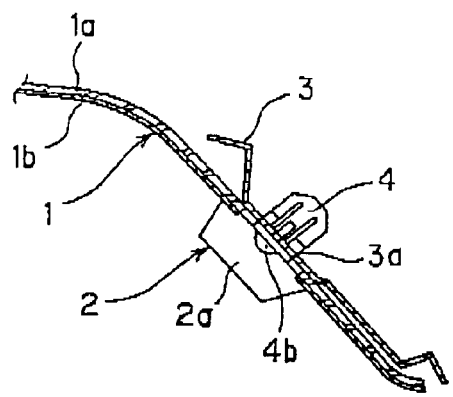
FIG. 14 shows a conventional securing structure of the assist grip.
Figure 15:
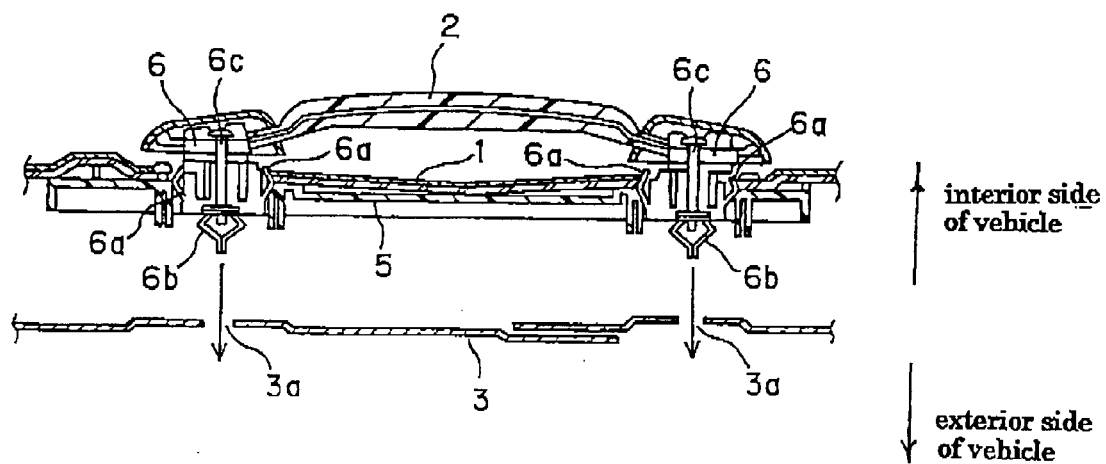
FIG. 15 shows a conventional module-structure of the assist grip.

In the preferred embodiment of the present invention so far described, the claws 36 formed on the side panel 32 of the resin-made bracket 30 are engaged with the sub-attaching grooves 55 formed in the leg members 53 of the attachment members 50 of the assist grip 20, the claws 36 may as well protrude towards the upper part of the resin-made bracket 30 as shown in FIG. 12. In this case, the setting positions of both the sub-attaching grooves 55 and the fixing grooves 56 to be provided in the attachment members 50 of the assist grip 20 should be altered.

While the description of the foregoing embodiments referred to the module-structure for the roof trim 10 and the assist grip 20, the same holds true of a module-structure for fitting sun visor brackets or holders or to a room mirror bracket to the roof trim 10. Thus, according to the present, accessories in general to be installed in the interior side of the roof trim 10 is adaptable.

What is claimed is:

1. A module-structure for roof trim for use in installing a roof trim and various accessories to an interior side of a vehicle roof panel by placing a bracket having a spacer function between the roof trim and the roof panel in the positions between the roof trim and the roof panel in the positions matching the accessories, said module-structure comprising:

attachment members formed on said accessories, wherein said attachment members are capable of being temporarily accommodated in said bracket, said bracket provided on the back side of the roof trim through openings in the roof trim so that accessories, roof trim and brackets can be temporarily secured with an end portion of the attachment member being located within a thickness of the bracket, said attachment member being protrudable from said bracket for alignment with and insertion into attachment holes in the roof panel thereby engaging connecting portions of the attachment member with the attachment holes of the roof panel; and an inserted body inserted into the attachment members, wherein said inserted body locks the connecting portions of said attachment members by insertion so that said roof trim and accessories are integrally assembled to said roof panel through said bracket.

2. The module-structure for roof trim according to claim 1, wherein said attachment members are temporarily supported within said bracket by a securing structure where said bracket and said attachment members are temporarily secured in the sub-attaching position when said attachment members of said accessories are inserted into said brackets through said openings in said roof trim.

3. The module-structure for roof trim according to claim 2, wherein claws on one side and grooves on the other side, said grooves being engaged with the claws, are provided in the securing structure between said attachment members of said accessories and said bracket.

4. The module-structure for roof trim according to claim 3, wherein said attachment members of said accessories are held in a locked position by providing a second securing structure where said attachment members and said bracket are secured in a state in which said attachment members of said accessories protrude towards a vehicle body panel.

5. The module-structure for roof trim according to any of claims 1 through 4, wherein said brackets are composed of a resin molding formed in a hollow box shape and have a function to absorb an impact due to side collision of the vehicle.

* * * * *